United States Patent
Perrin et al.

(10) Patent No.: US 8,689,338 B2
(45) Date of Patent: Apr. 1, 2014

(54) SECURE TERMINAL, A ROUTINE AND A METHOD OF PROTECTING A SECRET KEY

(75) Inventors: Jean-Philippe Perrin, Seoul (KR); Harald Norbert Bauer, Nuremberg (DE); Patrick Fulcheri, Antibes (FR)

(73) Assignee: ST-Ericsson SA, Geneva (CH)

( * ) Notice: Subject to any disclaimer, the term of this patent is extended or adjusted under 35 U.S.C. 154(b) by 978 days.

(21) Appl. No.: 11/997,214

(22) PCT Filed: Aug. 1, 2006

(86) PCT No.: PCT/IB2006/052616
§ 371 (c)(1),
(2), (4) Date: Feb. 26, 2008

(87) PCT Pub. No.: WO2007/015204
PCT Pub. Date: Feb. 8, 2007

(65) Prior Publication Data
US 2008/0229425 A1    Sep. 18, 2008

(30) Foreign Application Priority Data

Aug. 3, 2005  (EP) .................................... 05300649

(51) Int. Cl.
*G06F 7/04*  (2006.01)
(52) U.S. Cl.
USPC .................... 726/26; 726/22; 713/2; 380/264
(58) Field of Classification Search
USPC .................... 726/22, 26, 264; 713/2; 380/264
See application file for complete search history.

(56) References Cited

U.S. PATENT DOCUMENTS

| | | | |
|---|---|---|---|
| 6,609,199 B1* | 8/2003 | DeTreville | 713/172 |
| 6,615,355 B2* | 9/2003 | Mattison | 713/193 |
| 6,704,871 B1 | 3/2004 | Kaplan et al. | |
| 7,020,772 B2* | 3/2006 | England et al. | 713/166 |
| 7,050,581 B1* | 5/2006 | Goubin et al. | 380/28 |
| 7,051,251 B2* | 5/2006 | Moore et al. | 714/710 |
| 7,133,524 B2* | 11/2006 | Fujiwara et al. | 380/45 |
| 7,200,235 B1* | 4/2007 | Trimberger | 380/277 |
| 7,293,148 B2* | 11/2007 | Schneider et al. | 711/164 |

(Continued)

FOREIGN PATENT DOCUMENTS

| | | |
|---|---|---|
| JP | 2002082909 A | 3/2002 |
| JP | 2003198625 A | 7/2003 |

(Continued)

OTHER PUBLICATIONS

Partial English translation of Japanese Office Action for application No. 2008-524653, mailed Jan. 25, 2011, pp. 5.

*Primary Examiner* — Carl Colin
*Assistant Examiner* — Mohammad A Siddiqi
(74) *Attorney, Agent, or Firm* — William J. Kubida; Peter J. Meza; Hogan Lovells US LLP

(57) ABSTRACT

The method of protecting a secret key from being read by a non-secure software application, comprises a step (94) of recording the secret key as a routine stored in an executable-only memory. The routine having: load instructions to load the secret key into a memory readable by a secure and a non-secure software application, if the routine is called by the secure software application, and control instructions to leave only dummy data instead of the secret key in the readable memory if the software application calling the executable-only routine is the non-secure software application.

15 Claims, 3 Drawing Sheets

(56) References Cited

U.S. PATENT DOCUMENTS

| | | | |
|---|---|---|---|
| 7,313,705 B2 * | 12/2007 | Turkboylari | 713/193 |
| 7,826,613 B2 * | 11/2010 | Rose et al. | 380/37 |
| 2002/0002676 A1 * | 1/2002 | Kawasaki et al. | 713/161 |
| 2003/0114144 A1 | 6/2003 | Minemura | |
| 2003/0154355 A1 * | 8/2003 | Fernandez | 711/163 |
| 2005/0235291 A1 | 10/2005 | Kamiya et al. | |
| 2006/0004678 A1 * | 1/2006 | Tonino et al. | 705/408 |
| 2006/0004829 A1 * | 1/2006 | Walmsley et al. | 707/102 |

FOREIGN PATENT DOCUMENTS

| | | |
|---|---|---|
| JP | 2003-223235 A | 8/2003 |
| JP | 2003-332978 A | 11/2003 |
| JP | 2004046532 A | 2/2004 |
| WO | 03027815 A2 | 4/2003 |

* cited by examiner

SECURE TERMINAL, A ROUTINE AND A METHOD OF PROTECTING A SECRET KEY

FIELD OF THE INVENTION

The present invention relates to a secure terminal, a routine and a method of protecting a secret key.

BACKGROUND OF THE INVENTION

Typically, secure terminals comprise:
a processor to execute software applications and routines called by the software applications and,
at least one secret key.
The processor can execute non-secure software applications as well as secure software applications.

Non-secure software applications are software applications that can be easily updated or changed. Typically, non-secure software applications are written in memories that can be rewritten such as flash memories, for example.

In contrast, secure software applications are applications that cannot be easily changed. For example, secure software applications are written in a read-only memory during the manufacturing process of the secure terminals. The read-only memory is protected so that each secure software application cannot be easily changed.

The non-secure software applications are the weak points of a secure terminal because they can be changed by a hacker. However, for the design of secure terminals, it is not suitable to record any software application in read-only memories. Therefore, there is always the threat that a hacker may change a non-secure software application so that the changed non-secure software application reads the secret key and discloses it to the hacker.

SUMMARY OF THE INVENTION

Accordingly, it is an object of the invention to provide a method of protecting a secret key form being read by a non-secure software application.

The invention provides a method of protecting a secret key from being read by a non-secure software application comprising the step of recording the secret key as an executable-only routine stored in an executable-only memory, the routine having:
load instructions to load the secret key in a memory readable by a secure and a non-secure software application, if the routine is called by the secure software application, and
control instructions to leave only dummy data instead of the secret key in the readable memory if the software application calling the executable-only routine is the non-secure software application.

The secret key is recorded as a routine that is stored in an executable-only memory. For this reason, this routine is called an "executable-only routine". The executable-only routine cannot be read but only executed by the processor. Thus, the only means to obtain the secret key is to execute the executable-only routine. However, when executed, the routine itself ensures that secret information on the secret key does not leak to the non-secure software application. The key itself is therefore unreadable by a non-secure software application.

The embodiments of the above method may comprise one or several of the following features:

the load instructions are instructions to load constants, the value of each constant being embedded within the routine code and representing at least one bit of the secret key,
the method comprises the steps of disabling any IRQ (Interrupt Request) before the load instructions are executed and re-enabling the IRQ only after the secret key loaded in the readable memory has been deleted,
the executable-only routine returns systematically to a secure software application and any secure software application deletes the loaded secret key before executing the IRQ re-enabling step,
the secure software application to which the executable-only routine returns, immediately deletes the loaded secret key if the secure software application was not called by the executable-only routine.

The above embodiments of the method present the following advantages:
having the secret key embedded in the executable-only routine as loadable constants reinforces the security of the embodiments;
disabling IRQ prevents any non-secure software application from reading the secret key loaded in the readable memory because non-secure software applications cannot be executed as long as the IRQ is disabled;
systematically returning to a secure software application at the end of the execution of the executable-only routine prevents attack that would consist for a non-secure software application of calling the executable-only routine using a return address that corresponds to the secure software application;
deleting the secret key from the readable memory if the executable-only routine was not called by a secure software application reinforces the security of the terminal by preventing other non-secure software applications to call the executable-only routine.

The invention also relates to an executable-only routine to be used in the above method of protecting a secret key from being readable by a non-secure software application. The executable-only routine comprises:
load instructions to load the secret key in a memory readable by a secure and a non-secure software application, if the routine is called by the secure software application, and
control instructions to leave only dummy data instead of the secret key in the readable memory if the software application calling the executable-only routine is the non-secure software application.

The embodiments of the above executable-only routine may comprise one or several of the following features:
the load instructions are instructions to load constants, the value of each constant being embedded within the routine code and representing at least one bit of the secret key,
the executable-only routine has instructions to disable any IRQ at the beginning of the execution of the executable-only routine,
the executable-only routine has instruction to systematically return to a secure software application at the end of the execution of the executable-only routine.

The invention also relates to a secure terminal comprising:
a processor to execute software applications and routines called by the software applications and,
at least one secret key,
wherein the secure terminal also comprises an executable-only memory adapted to record an executable-only routine having:

load instructions to load the secret key in a memory readable by a secure and a non-secure software application, if the routine is called by the secure software application, and control instructions to leave only dummy data instead of the secret key in the readable memory if the software application calling the executable-only routine is the non-secure software application.

The embodiment of the secure terminal may comprise one or several of the following features:

the load instructions are instructions to load constants, the value of each constant being embedded in the routine code and representing at least one bit of the secret key, the terminal comprises a read-only memory (ROM) comprising at least one instruction code of a secure software application, the instruction code having instruction to delete the loaded secure key in the readable memory, the terminal comprises:
  a read once memory readable only one time after reset of the terminal, the read once memory recording the secret key,
  a read only memory having a secure initializing routine to create the instruction code of the executable-only routine from the secret key stored in the read once memory, and to load the instruction code of the executable-only routine into the executable-only memory, the executable-only memory has a transaction decoder to authorize only instruction read operations and inhibit data read operations, the terminal is a mobile phone.

These and other aspects of the invention will be apparent from the following description, drawings and claims.

DESCRIPTION OF THE PREFERRED EMBODIMENTS

Figure 1:
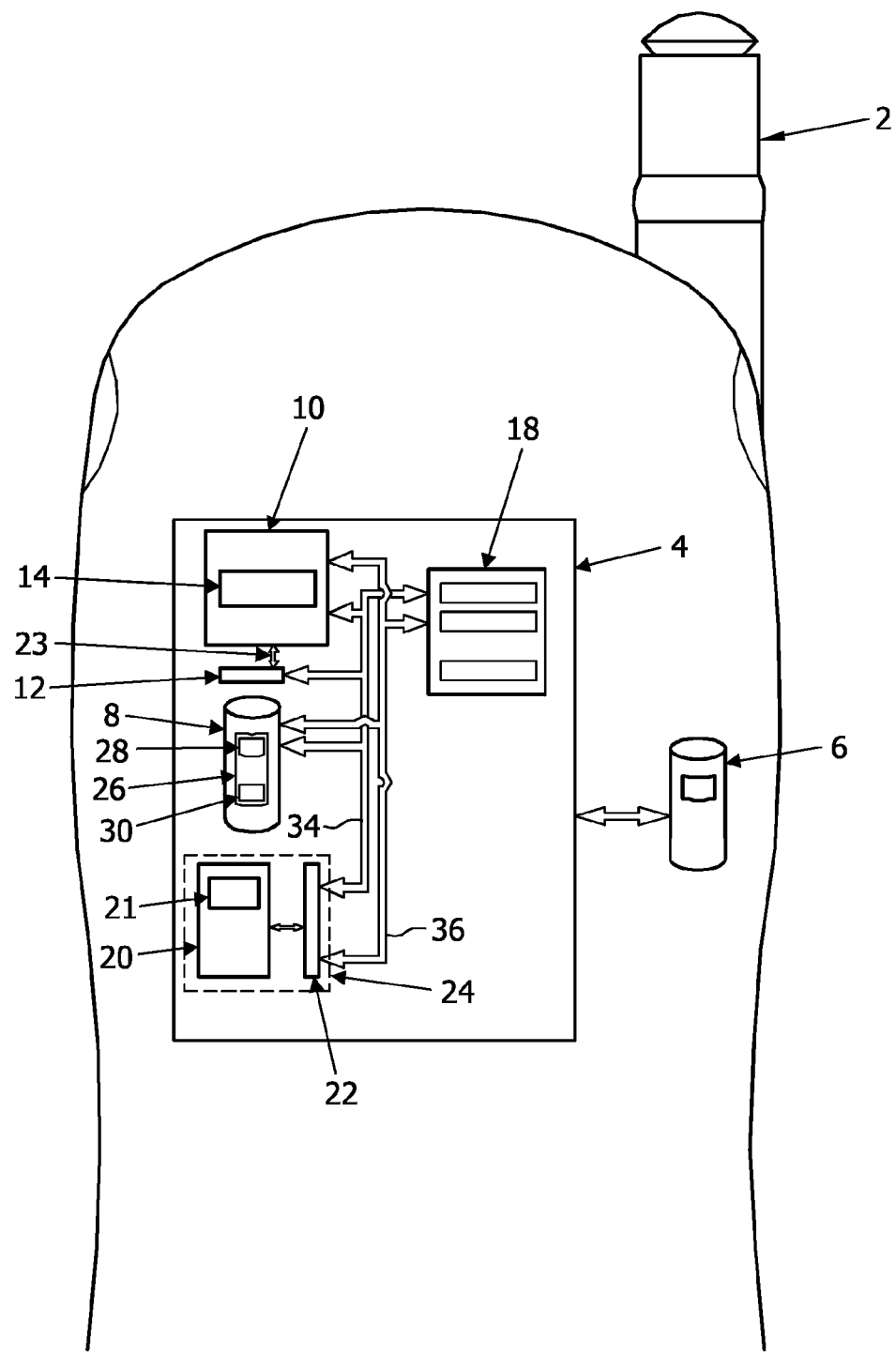
FIG. 1 is a schematic diagram of a secure terminal.

FIG. 1 shows a secure terminal 2 having an electronic processor 4 connected to an external memory 6. For example, terminal 2 is a mobile phone and processor 4 is a baseband processor. Or more generally any SoC (System On Chip)

Memory 6 can be rewritten and records the codes of non-secure software applications. Each code is made of instructions executable by processor 4. For example, memory 6 is a flash memory.

Processor 4 is able to execute non-secure software applications stored in memory 6 as well as secure software applications stored in ROM (Read-Only Memory) 8.

For simplicity, only the elements of processor 4 that are necessary to understand the invention are shown in FIG. 1.

Processor 4 includes:
a central processing unit 10,
ROM 8;
a read-only once memory 12 that permanently records at least one secret key;
a RAM (Random Access Memory) or internal data registers 18 that store data that can be read and used by any software application executed by unit 10;

a register bank 20 to store an executable-only routine 21; and
a transaction decoder 22 to restrict access to register bank 20.

For example, all the above elements 8 to 22 are built on at least one die and embedded in the same integrated circuit package. This is an important factor from the security point of view because this means that physical access to internal elements of processor 4 is not possible for casual hackers.

Unit 10 has a specific register 14 used to record the return address of a software application calling a routine;

For example, unit 10 is an ARM processor from the company ARM (refer to website: www.arm.com) or more generally any CPU (Central Processing Unit).

For exemplary purposes only, memory 12 records only one secret key. The secret key in memory 12 is stored using laser cutting in the silicon during the manufacturing process of processor 4. The stored secret key can only be read once after each reset of processor 4. To do so, a link 23 between unit 10 and memory 12 ensures that unit 10 and memory 12 are always reset at the same time.

Internal data registers 18 are used during the execution of a software application by unit 10 to store data that are necessary for this execution.

Register bank 20 is designed to record executable-only routine 21 that loads the secret key into registers 18. Routine 21 comprises:
  load instructions to load the secret key into registers 18;
  control instructions to load only dummy data instead of the secret key into registers 18 if the software application calling routine 21 is a non-secure software application;
  instructions to disable any IRQ (Interrupt Request) at the beginning of the execution of routine 21, and
  instructions to systematically return to a secure software application at the end of the execution of routine 21.

The load instructions are instructions to load constants into registers 18, each constant being a bit of the secret key. The values of the constants are embedded in the code of routine 21 and, more precisely, in the op-codes of the instruction of routine 21.

The combination of register bank 20 and transaction decoder 22 forms an executable-only memory 24, which will be described in more details in view of FIG. 2.

ROM 8 is a boot ROM, which records the codes of the software applications that are immediately started after a reset of processor 4. Each code is made of instructions executable by unit 10.

ROM 8 records the codes of any secure software application which is part of a secure kernel 26.

For example, secure kernel 26 has an initializing routine 28 that reads memory 12, creates the code of the execute only routine 21 and loads this code into register bank 20.

Kernel 26 has also secure software applications that are designed to check the authenticity of non-secure software applications. For example, kernel 26 has a secure software application 30 that is able to check that a non-secure software application is signed by a known authority or certified by such a known authority. Application 30 needs the secret key to perform such a task and therefore is designed to call routine 21 to obtain the secret key.

Any secure software application which calls routine 21 is able to:
  delete the secret key stored in internal registers 18 once it has been used, and
  enable IRQ (Interrupt Request) after the secret key has been deleted from register 18.

By deleting we mean replacing the secret key by dummy data which do not leak any usable information on the secret key. This can be done by overwriting the key with a constant such as 0.

ROM 8, memories 12, 24 and register 18 are connected to unit 10 through a bus 34 and an address bus 36. Bus 34 is used to transmit both data to be processed by unit 10 and instructions to be executed by unit 10. Because there is only one common bus 34 to transmit alternatively data and instructions, bus 34 has a settable data/instruction tag that indicates if items over the bus are to be treated as data or, alternatively, as instructions.

Memory 12 is connected to unit 10 through bus 34, so that memory 12 can be read once after a reset of unit 10.

Figure 2:
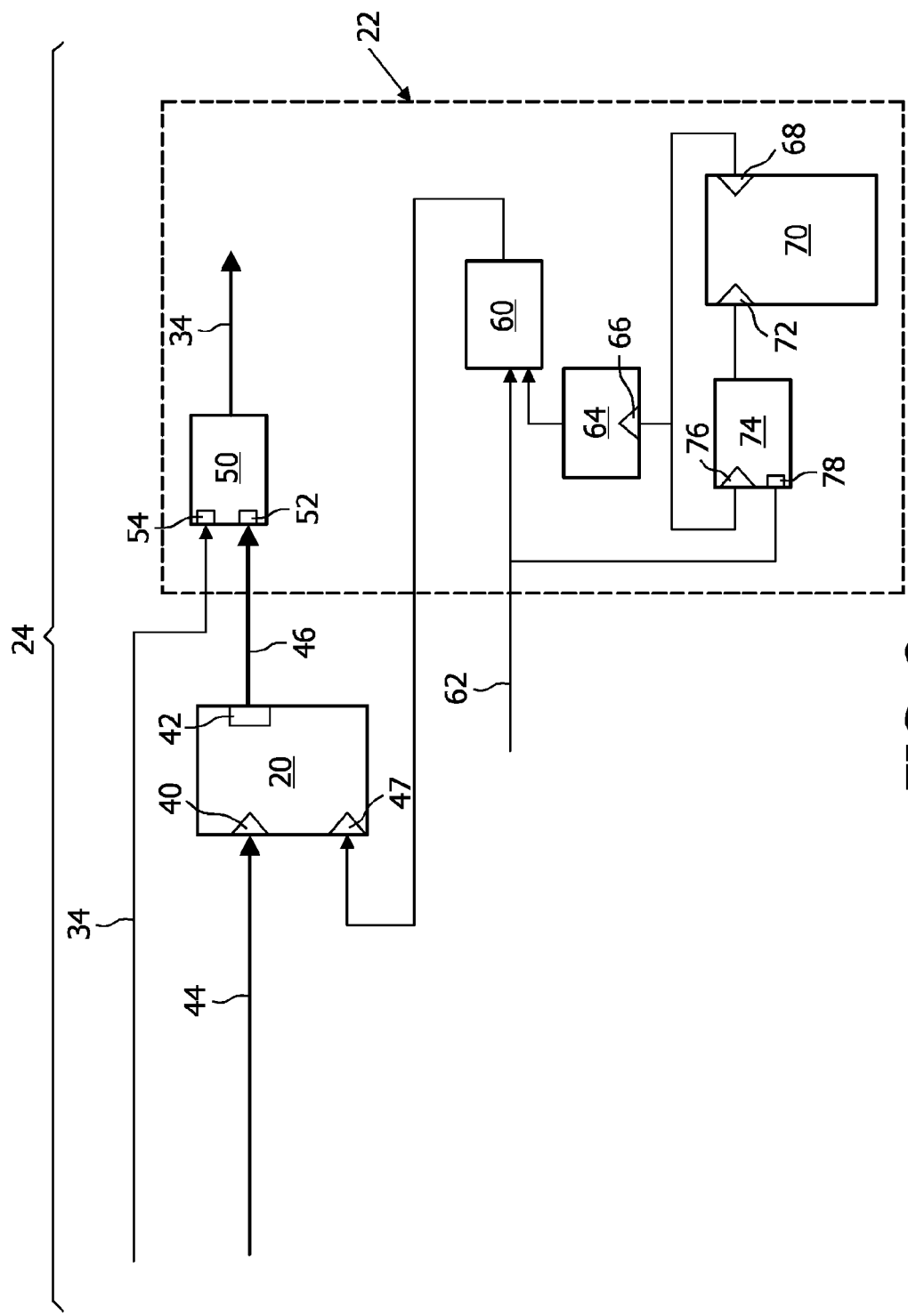
FIG. 2 is a schematic diagram of a transaction decoder implemented in the secure terminal of FIG. 1.

FIG. 2 shows the executable-only memory 24. The elements of memory 24 already described in FIG. 1 have the same references.

Register bank 20 has one port 40 that receives data to be written in register bank 20 and one port 42 to output data read in register bank 20. Port 40 is connected to a write data bus 44 to receive the data to be written. Port 42 is connected to a read data bus 46 to output the data to be read. For example, buses 44 and 46 are 32 bit-wise buses. Writing data into register bank 20 is only possible if an input 47 of bank 20 receives a logic one.

Transaction decoder 22 has a logic AND unit 50 having one input port 52 connected to bus 46 and one input port 54 connected to bus 34 to receive the data/instruction tag. The data/instruction tag is equal to a logic zero when data are to be read from register bank 20, and equal to a logic one when instructions are to be read from register bank 20.

Unit 50 performs a logic AND operation between the data present on bus 46 and the value of the data/instruction tag, and outputs the result on data bus 34.

Memory 24 is also a write-once memory. More precisely, memory 24 can be written only one time after each reset of processor 4. To do so, decoder 22 has an AND gate 60, inputs of which are connected to a write signal 62 of bus 34, and to the output of an inverter 64. An input 66 of inverter 64 is connected to an output 68 of a locking latch 70.

Gate 60 performs a logic AND between the write signal 62 and the output of inverter 64 and sends the result to input 47.

An input 72 of locking latch 70 is connected to an output of an OR gate 74. A first input 76 of gate 74 is connected to output 68. A second input 78 of gate 74 is connected to write signal 62. Gate 74 performs a logic OR operation between the signal present on its inputs 76 and 78 and outputs the result to input 72 of locking latch 70.

Locking latch 70 is designed to output through output 68 a logic zero when it is activated for the first time after processor 4 has been reset. For example, latch 70 is connected to unit 10 using a link, such as link 23, to ensure that unit 10 and latch 70 are always reset at the same time. Subsequently, locking latch 70 outputs through output 68 a value equal to the value received on its input 72.

Figure 3:
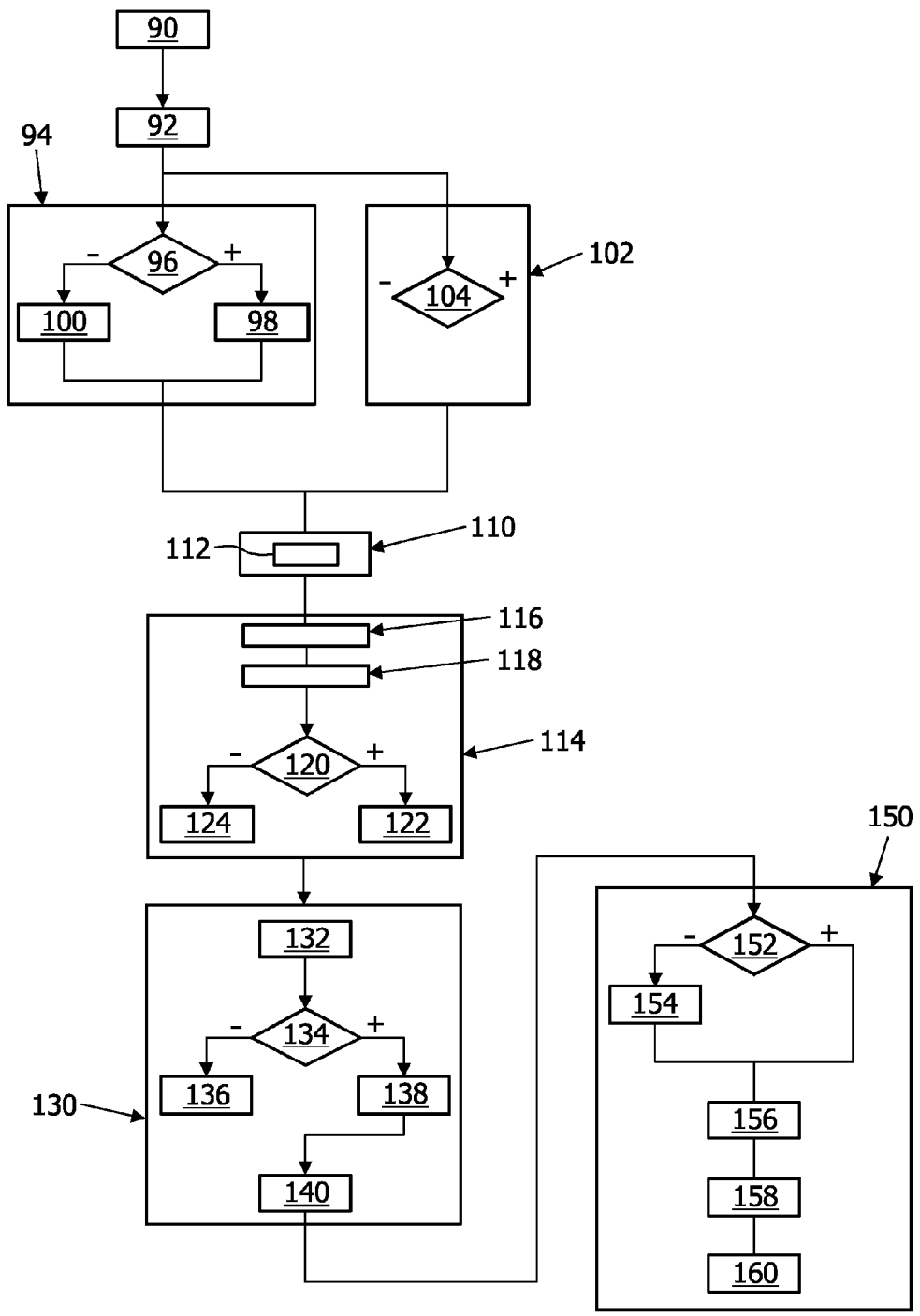
FIG. 3 is a flowchart of a method of protecting a secret key from being read by a non-secure software application in the terminal of FIG. 1.

The operation of terminal 2 will now be described with reference to FIG. 3.

Initially, in step 90, processor 4 is reset. In step 90, latch 70 is reset and returns to its initial state. Memory 12 is also reset and enables one read operation.

After reset, unit 10 immediately starts executing a software application stored in ROM 8.

Subsequently, in step 92, initializing routine 28 reads the value of the secret key stored in memory 12 and creates the corresponding code of routine 21. Because memory 12 was read for the first time after reset by routine 28, subsequently memory 12 cannot be read any more as long as processor 4 is not reset.

In step 94, routine 28 writes and records the code of routine 21 into register bank 20.

At the beginning, write signal 62 is equal to one and the output 68 of latch 70 is equal to zero.

During operation 96, gate 60 compares the write signal value and the output of inverter 64. If both of them are equal to one, during an operation 98, a logic one is set on input 47 and the code of routine 21 sent through bus 44 is written and stored in register bank 20.

In contrast, during operation 100, if the output of inverter 64 is equal to zero, a logic zero is set on input 47 and no data can be written into register bank 20.

In parallel with step 94, in step 102 the fact that a first writing of data into register bank 20 has already been done is stored to prevent any new writing of data in register bank 20 as long as processor 4 is not reset once again.

More precisely, in operation 104, the value of the write signal 62 is compared to the value of output 68 by gate 74. If inputs 76 and 78 are both equal to zero, then gate 74 outputs a logic zero to input 72, else gate 74 outputs a logic one.

Thus, if it is the first time that data are written into register bank 20, the output 68 is equal to zero, so that the output of inverter 64 is equal to one and the code of routine 21 can be written and stored in register bank 20.

When it is the second time or any subsequent time that data are to be written in register bank 20, output 68 is equal to a logic one, so that the output of inverter 64 is equal to zero and data cannot be written into register bank 20. Therefore, once stored in register bank 20, the code of routine 21 cannot be changed as long as processor 4 is not reset.

As a result, memory 24 is a write-once memory.

At the end of the first execution of step 94, the code of routine 21 is written into register bank 20.

Then, typically, processor 4 executes non-secure software applications. When cryptographic operations are needed, software application 30 is called. For example, cryptographic operation is needed to decrypt a DRM (Digital Right Management) license.

Thereafter, in step 110, secure software application 30 calls routine 21. At this time, during an operation 112, unit 10 writes the return address of the calling application into register 14.

In step 114, unit 10 reads the code of routine 21 in register bank 20 to execute it. Therefore, the data/instruction tag is set to one. First, in operation 116, unit 10 sends a register bank read instruction through bus 34.

In response, in step 118, register bank 20 puts the corresponding instructions on bus 46.

In operation 120, unit 50 compares the instruction received on port 52 to the value of the data/instruction tag received on port 54.

In operation 122, if the value of this tag is equal to one, unit 50 outputs the read instructions on bus 34. Because the tag value is equal to one, the output instructions can only be interpreted as instructions for unit 10 and so are directly executed by unit 10. A software application cannot access the data on bus 34 when the data/instruction tag is equal to one.

If an attempt was made to read the instructions stored in register bank 20 as data, the data/instruction tag would then be equal to zero and unit 50 would only output zero instead of the corresponding instructions during an operation 124.

Therefore, if a non-secure software application attempts to read the code stored in memory 24, it only obtains dummy data, i.e. zeros.

As a result, memory 24 is an executable-only memory and routine 21 is an executable-only routine because its code can only be executed by unit 10 and cannot be read by software application executed by processor 4.

Because the data/instruction tag is equal to one, the instructions present on bus 34 are executed by unit 10 in step 130.

At the beginning of step 130, in an operation 132, unit 10 disables any IRQ (Interrupt Request) so that the execution of the following instructions cannot be interrupted by any software application. Thus, no other software applications can read any internal data stored in registers 18.

Thereafter, in operations 134 and 136, unit 10 executes the control instructions of routine 21.

In operation 134, unit 10 checks that routine 21 was called by a secure software application. For example, during operation 134, unit 10 compares the return address written in register 14 to the memory addresses of ROM 8.

If the return address written in register 14 is not within the range of addresses of ROM 8, in an operation 136, unit 10 loads dummy data like a succession of zeros into registers 18. At the end of operation 136, processor 4 returns to the return address written in register 14. As a result, the non-secure software application that called routine 21 obtains no information on the secret key.

If the return address is an address of a secure software application, then, in step 138, unit 10 executes the load instructions of routine 21. Thus, register 4 is loaded with the value of the secret key. Once this has been done, during operation 140, unit 10 executes the instructions of routine 21 to systematically return to a secure software application. For instance, unit 10 unconditionally jumps to the address of secure software application 30. This jump instruction is executed whatever the return address put on top of stack 14. For example, during operation 140, unit 10 calls application 30. More precisely, unit 10 executes a branch and link instruction to application 30. The branch and link instruction also records the address of the called application in specific register 14, i.e. the address of routine 21.

Thereafter, during a phase 150, application 30 uses the secret key value written in registers 18.

For example, at the beginning of phase 150, in step 152 application 30 checks if it was called by routine 21. For example, unit 10 checks that the address written in register 16 corresponds to the address of a routine 21.

If such a condition is not fulfilled, in step 154, unit 10 deletes the secret key written in registers 18. For example, unit 10 replaces secret key by a succession of zeros. Subsequently, application 30 proceeds as if it did call routine 21.

In step 156, application 30 uses the secret key written in registers 18 to check or certify non-secure software applications, for example. In doing so, cryptographic operations are carried out using the secret key.

When application 30 does not need the secret key any longer, in step 158, unit 10 deletes the secret key from registers 18.

Subsequently, in step 160, unit 10 re-enables IRQs.

The method then returns to the main software application that called application 30 in step 110.

Many additional embodiments are possible. For example, rather than deleting the secret key when routine 21 is called from a non-secure software application, it is also possible to block terminal 2 so that it can no longer be used.

The IRQ may also be disabled by application 30 before calling routine 21.

Here, routine 21 is written in a non-permanent memory that needs to be refreshed after each reset of terminal 2. However, it is also possible to replace register bank 21 with a permanent memory like a ROM. In this embodiment, it is no longer necessary to restore the code of routine 21 after each resetting of terminal 2.

Instead of one secret key, the above terminal and method may be adapted to protect a plurality of secret key from being read by a non-secure software application.

The above teachings also apply when the memory storing non-secure software applications is an internal memory of processor 4.

What has been described herein is not limited to mobile phones but applies to any secure electronic terminal.

The invention claimed is:

1. A method of protecting a secret key from being read by a non-secure software application, the method comprising:
   recording the secret key in a read-only once memory;
   reading the secret key after the reset of a processor; and
   generating from the secret key an executable-only routine which is stored in a write-once and executable-only memory, the executable-only routine being embedded with constants respectively corresponding to bits of said secret key and further having:
   load instructions to load said constants in a memory readable by a secure and a non-secure software application in the case that the executable-only routine is called by the secure software application, and
   control instructions to leave only dummy data instead of said constants in a readable memory in the case that the executable-only routine is called by the non-secure software application.

2. The method of claim 1, wherein the load instructions are instructions to load constants, the value of each constant being embedded in the executable-only routine code and representing at least one bit of the secret key.

3. The method according to claim 1, wherein the method comprises the steps of disabling any IRQ (Interrupt Request) before the load instructions are executed and re-enabling the IRQ only after the secret key loaded in the readable memory has been deleted.

4. The method according to claim 3, wherein the executable-only routine returns systematically to the secure software application and any secure software application deletes the loaded secret key before executing the IRQ re-enabling step.

5. The method according to claim 4, wherein the secure software application to which the executable-only routine returns immediately deletes the loaded secret key if the secure software application was not called by the executable-only routine.

6. An executable-only routine contained in a method of protecting a secret key from being read by a non-secure software application, the method comprising the steps of (1) recording the secret key in a read-only once memory, (2) reading the secret key after the reset of a processor and (3) generating from the secret key the executable-only routine stored in a write-once and executable-only memory, wherein the executable-only routine is embedded with constants respectively corresponding to bits of said secret key and further comprises:
   load instructions to load said constants in a memory readable by a secure and a non-secure software application, in the case that the executable-only routine is called by the secure software application, and
   control instructions to leave only dummy data instead of said constants in a readable memory in the case that the executable-only routine is called by the non-secure software application.

7. The executable-only routine according to claim 6, wherein the load instructions are instructions to load constants, the value of each constant being embedded in the executable-only routine code and representing at least one bit of the secret key.

8. The executable-only routine according to claim 6, wherein the executable-only routine has instructions to disable any IRQ at the beginning of the execution of the executable-only routine.

9. The executable-only routine according to claim 8, wherein the executable-only routine has an instruction to systematically return to the secure software application at the end of the execution of the executable-only routine.

10. A secure terminal comprising:

a processor to execute software applications and routines called by the software applications, and at least one secret key stored in a read-only once memory, said secret key being read after the reset of said processor, and from which is generated an executable-only routine stored in a write-once and executable-only memory, the executable-only routine being embedded with constants respectively corresponding to bits of said secret key and further comprising:

load instructions to load said constants into a memory readable by a secure and a non-secure software application, in the case that the executable-only routine is called by the secure software application, and control instructions to leave only dummy data instead of said constants in the readable memory in the case that the executable-only routine is called by the non-secure software application.

11. The secure terminal according to claim 10, wherein the load instructions are instructions to load constants, the value of each constant being embedded in the executable-only routine code and representing at least one bit of the secret key.

12. The secure terminal according to claim 10, wherein the terminal comprises a read only memory (ROM) comprising at least one instruction code of the secure software application, the instruction code having an instruction to delete the loaded secure key from the readable memory.

13. The secure terminal according to claim 10, wherein the secure terminal comprises:

a read once memory readable only one time after reset of the terminal, the read once memory recording the secret key, a read only memory having a secure initializing routine to create an instruction code of the executable-only routine from the secret key written in the read once memory, and to load the instruction code of the executable-only routine into the executable-only memory.

14. The secure terminal according to claim 13, wherein the executable-only memory has a transaction decoder to authorize only instruction read operations and inhibit data read operations.

15. The secure terminal according to claim 10, wherein the secure terminal is a mobile phone.

\* \* \* \* \*